Aug. 11, 1959   H. R. GULLIXSON   2,899,076
DEVICE FOR HOLDING FLAT ARTICLES OR THE LIKE
Filed April 8, 1957   4 Sheets-Sheet 1

INVENTOR
HAROLD R. GULLIXSON
BY
Cushman, Darby & Cushman
ATTORNEYS

Aug. 11, 1959  H. R. GULLIXSON  2,899,076
DEVICE FOR HOLDING FLAT ARTICLES OR THE LIKE
Filed April 8, 1957  4 Sheets-Sheet 3
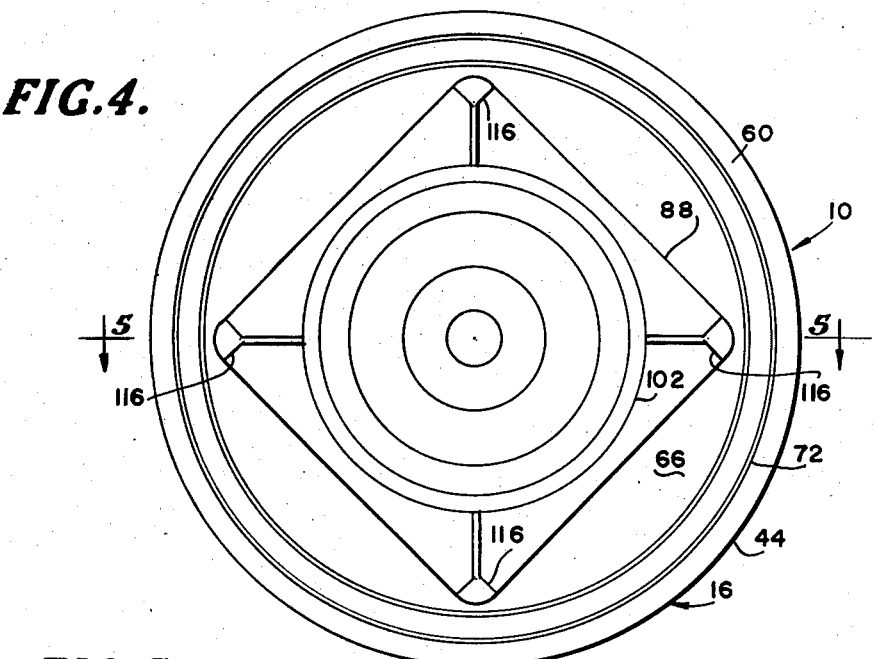
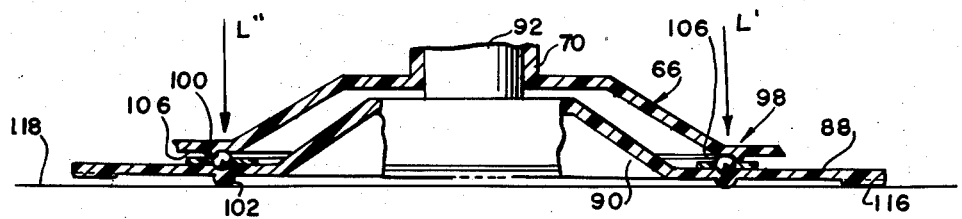
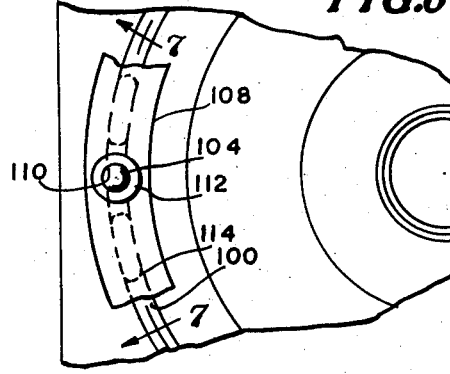
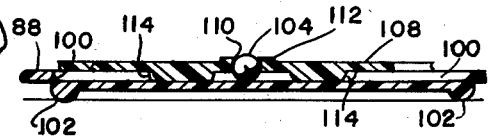
INVENTOR
HAROLD R. GULLIXSON
BY Cushman, Darby & Cushman
ATTORNEYS

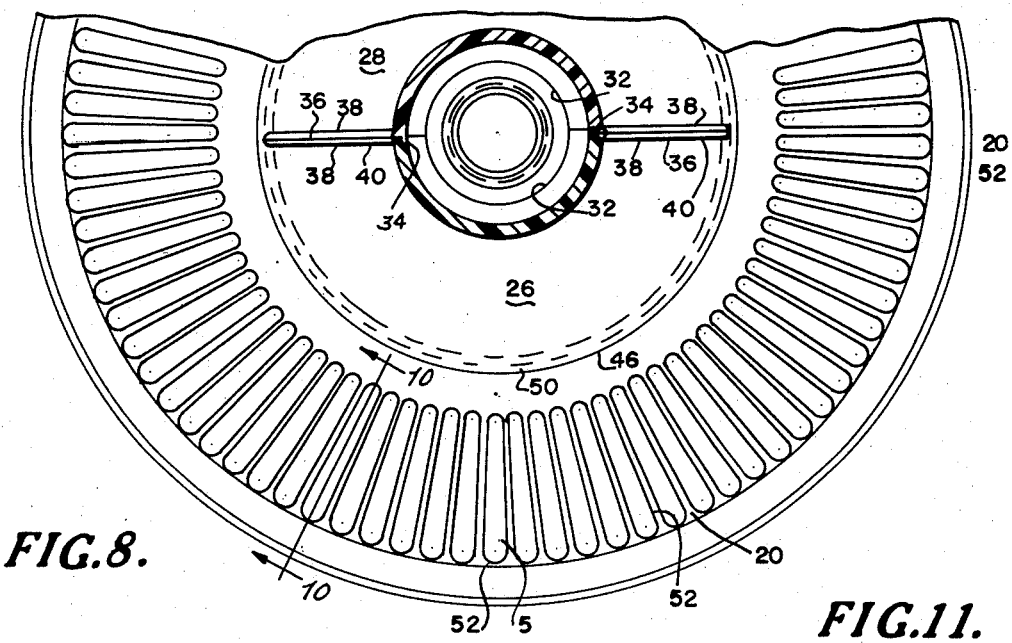
FIG.8.
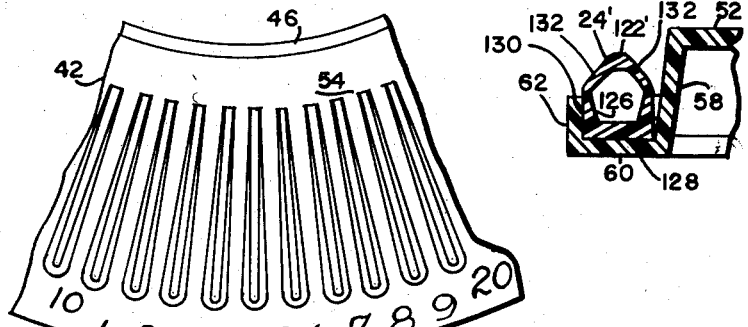
FIG.9.
FIG.11.
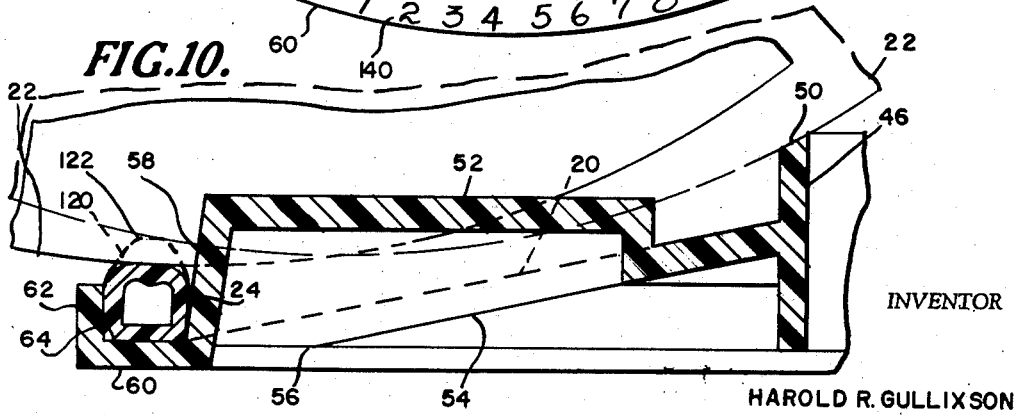
FIG.10.
INVENTOR
HAROLD R. GULLIXSON United States Patent Office 2,899,076
Patented Aug. 11, 1959

2,899,076

DEVICE FOR HOLDING FLAT ARTICLES OR THE LIKE

Harold R. Gullixson, Greensboro, N.C.

Application April 8, 1957, Serial No. 651,515

20 Claims. (Cl. 211—40)

The present invention relates to a device for the storage of flat articles and, more particularly, to improvements in a device for the storage of disk-shaped articles, such as phonograph records, or the like.

This application is a continuation-in-part of my copending application, Serial No. 599,762, filed July 24, 1956, entitled Device for Holding Flat Articles or the Like. The subject-matter of my aforementioned copending application, Serial No. 599,762, is incorporated by reference, in its entirety, in this application.

An object of the present invention is to provide a holder for flat substantially rigid articles, which will protect and individually support the articles, yet have the articles readily accessible for removal therefrom.

Another object of the present invention is to provide a holder for flat articles, such as phonograph records or the like, the holder being manufactured from a non-brittle plastic such as polystyrene or the like, the parts of the holder being formed by high impact injection molding.

Still another object of the present invention is to provide an article holder of the type which has a plurality of aligned grooves for individually receiving the articles, the article holder having improved guide means for inserting articles into aligned grooves.

Still another object of the present invention is to provide an article holder for disk-shaped articles, the parts thereof being made from high impact polystyrene by injection molding, and the article holder being so designed as to substantially prevent warping of various elements caused by cold flow characteristics normally found in such plastic. One of the difficulties encountered today in high impact injection molding of plastic articles results from the cold flow of the plastic material in the finished article under normal temperature and load conditions. The arrangement of the various parts of the article holder, as will be described later in the specification, prevents any deformation of the holder from cold flow.

Still another object of the present invention is to provide an article holder for disk-shaped articles, the article holder being spool-shaped and so constructed and assembled as to prevent fracture of the center post.

Still another object of the present invention is to provide an article holder for flat articles such as phonograph records or the like, which is provided with improved means for individually retaining articles in stored position.

A further object of the present invention is to provide an article holder for disk-shaped articles which may be mounted for rotation on either a vertical or horizontal axis, the articles being positively held in position within the holder regardless of the holder's position.

A still further object of the present invention is to provide an article holder for the storage of disk-shaped articles, the article holder being capable of withstanding various weather conditions.

Still another object of the present invention is to provide an article holder for flat articles such as phonograph records or the like, which comprises a minimum of movable parts and which may be inexpensively manufactured.

Another object of the present invention is to provide an article holder for individually supporting a plurality of phonograph records, the weight of each record supported being distributed between at least two points of contact with the holder.

These and other objects of the present invention will appear more fully in the following specification, claims and drawings, in which:

Figure 4 is a bottom plan view of the present invention.

Figure 5 is a sectional view partly in elevation for purpose of clarity, the view being taken substantially on the line 5—5 of Figure 4.

Figure 6 is a fragmentary sectional view of the base plate for the article holder.

Figure 7 is a sectional view taken on the line 7—7 of Figure 6.

Figure 8 is a fragmentary sectional view through the center post of the article holder and showing the lower disk element in elevation.

Figure 9 is an enlarged fragmentary view of a portion of the top disk element with the flange plate removed.

Figure 10 is an enlarged fragmentary vertical sectional view through the lower disk element of the present invention and taken on the line 10—10 of Figure 8.

Figure 11 is an enlarged sectional view of a modified form of an article retaining ring.

Figure 1:
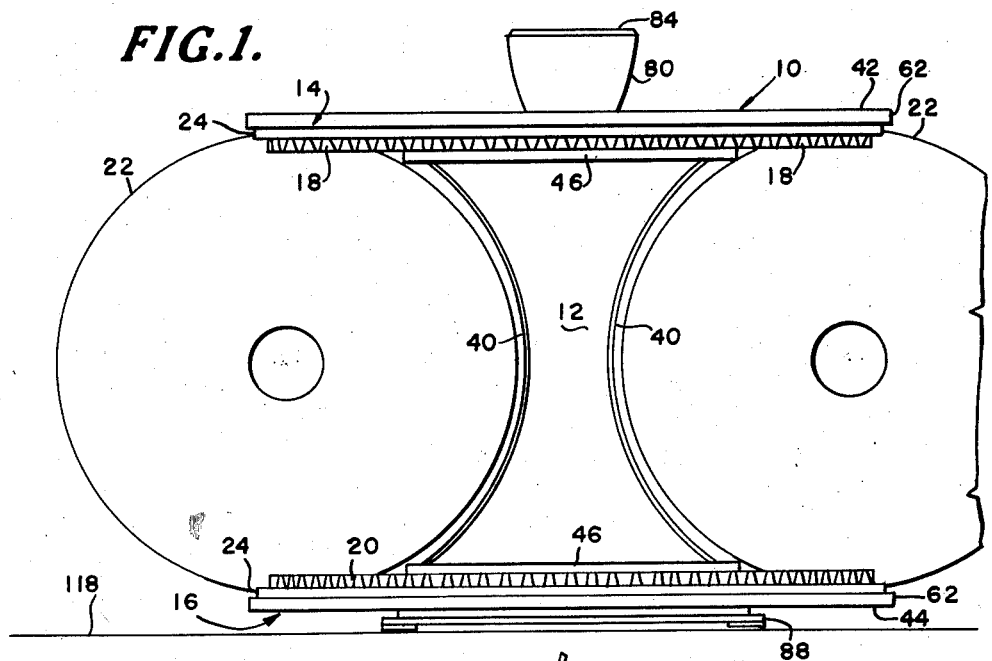
Figure 1 is a side elevational view of the device of the present invention, the device being illustrated holding only two of the disk-shaped articles.
Figure 2:
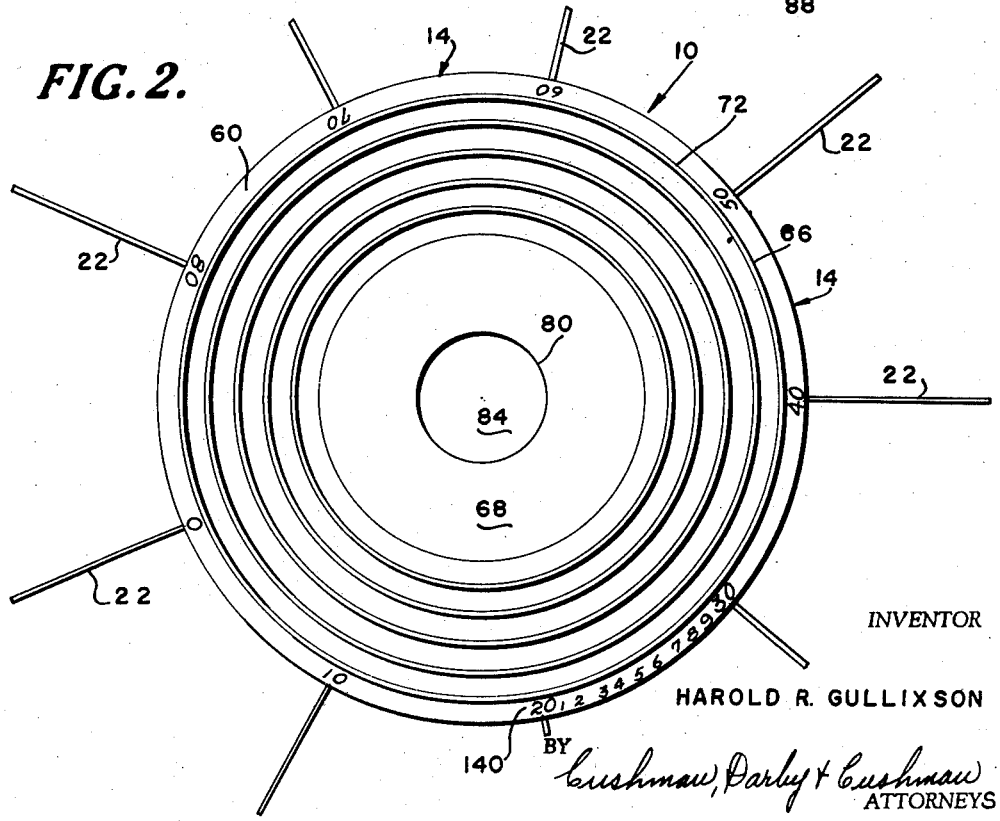
Figure 2 is a top plan view of the device shown in Figure 1, a plurality of articles disclosed as being held by the device.

Referring now to the drawings wherein like character or reference numerals represent like or similar parts, the article holder or device of the present invention includes a spool-shaped frame structure generally designated by the numeral 10, the frame structure being provided with novel means for retaining flat disk-shaped articles, such as phonograph records or the like, by their edges, in spaced relationship to each other. The spool-shaped frame structure 10 is made up of a plurality of elements, the elements being made from a non-brittle plastic material, such as high impact polystyrene. Each of the elements is formed by injection molding. The arrangement of the elements, when assembled, so as to result in the spool-shaped frame structure 10, is such that the device will not be effected by the cold flow characteristics common in non-brittle plastic material, such as polystyrene. As is now known in the art, one of the difficulties in articles molded from high impact polystyrene or the like, is a characteristic commonly called "cold flow," that is, after the article is made and at room temperatures or under normal load conditions, the plastic material will deform from its original molded shape, resulting in a permanent set. The cold flow characteristic of polystyrene has resulted in limited use of the material for certain articles of manufacture and, further, has proved unsatisfactory where articles of manufacture are used in certain climates, such as the hot and/or humid zones. As will be more apparent later in the specification, the article holder of the present invention is so assembled and used that the disadvantages from cold flow characteristics of polystyrene is not evident in the resultant article of manufacture.

Referring now to Figure 1, the spool-like frame structure 10 includes a center post 12, and a pair of spaced substantially parallel disk-shaped plate elements 14 and 16, respectively. The plate elements 14 and 16 are each provided with a plurality of grooves 18 and 20, respectively. Each groove 18 of the upper plate element 14 is aligned with one of the grooves 20 of the lower plate element 16 so that aligned grooves form article receiving pockets for individually supporting a plurality of disk-shaped articles 22. The disk-shaped articles 22, as disclosed in the drawing, are phonograph records but it is of course within the scope of the present invention that other types of articles could be stored in the article holder, such articles being either circular or rectangular, as described in detail in my aforementioned application, Serial No. 599,762.

Each of the articles 22 are retained in a pair of aligned grooves 18 and 20 by means of a resilient compressible strip 24 carried about the periphery of each of the plate elements 14 and 16, respectively. Strips 24, in their relaxed or normal position, substantially restrict the entrance to each of the grooves 18 and 20. The resilient strips 24 are spaced apart from each other a distance less than the diameter of the phonograph record 22 and when the record 22 is manually inserted into a pair of aligned grooves 18 and 20 the strips 24 are compressed so as to permit entry. When the phonograph record 22 is fully inserted into the grooves, the strips 24 will assume their normal relaxed position and will provide a stop to prevent accidental removal of the record 22 from the aligned grooves 18 and 20. However, when it is desired to remove one of the records 22 from a pair of aligned grooves 18 and 20, the force manually applied to the record radially outwardly of the record holder must be sufficient to cause the strips 24 to compress as is the case when the record is inserted.

Since the records 22 are positively retained in the grooves 18 and 20 by the resilient strips 24, which restrict entry to the grooves, the frame structure 10 may be mounted so that the center post 12 is either on a vertical or a horizontal axis. Further, by retaining the records 22 in the holder in such a manner that they may only be removed when a force is applied thereto, the article holder may be moved about by the user without fear of the records falling therefrom.

In more detail, the construction and assembly of the various elements of the frame structure 10 is as follows. The center post 12 is made of radially complementary half sections or members 26 and 28, each of the sections or members 26 and 28 being identical in size and shape and formed by injection molding of high impact polystyrene. The sections or members 26 and 28, when assembled together to form the center post 12, have an axial cross-section which is relatively small at its center or middle, as indicated at A in Figure 3, and which flare outwardly toward its ends, as indicated at B. When the sections 26 and 28 are assembled, the center post 12 will be substantially hollow and hourglass-shaped in profile. Flanges 30, provided on each end of the sections 26 and 28, extend parallel of the axis of the center post 12 when the members 26 and 28 are assembled together as the center post. The flanges 30 provide a means for strengthening the center post, as well as a means for attaching other elements of the frame structure to the center post, as will be described in more detail later in the specification. To further strengthen each of the members 26 and 28, a pair of radially inwardly extending arcuate spaced flanges 32 is integrally molded with each member.

Figure 3:
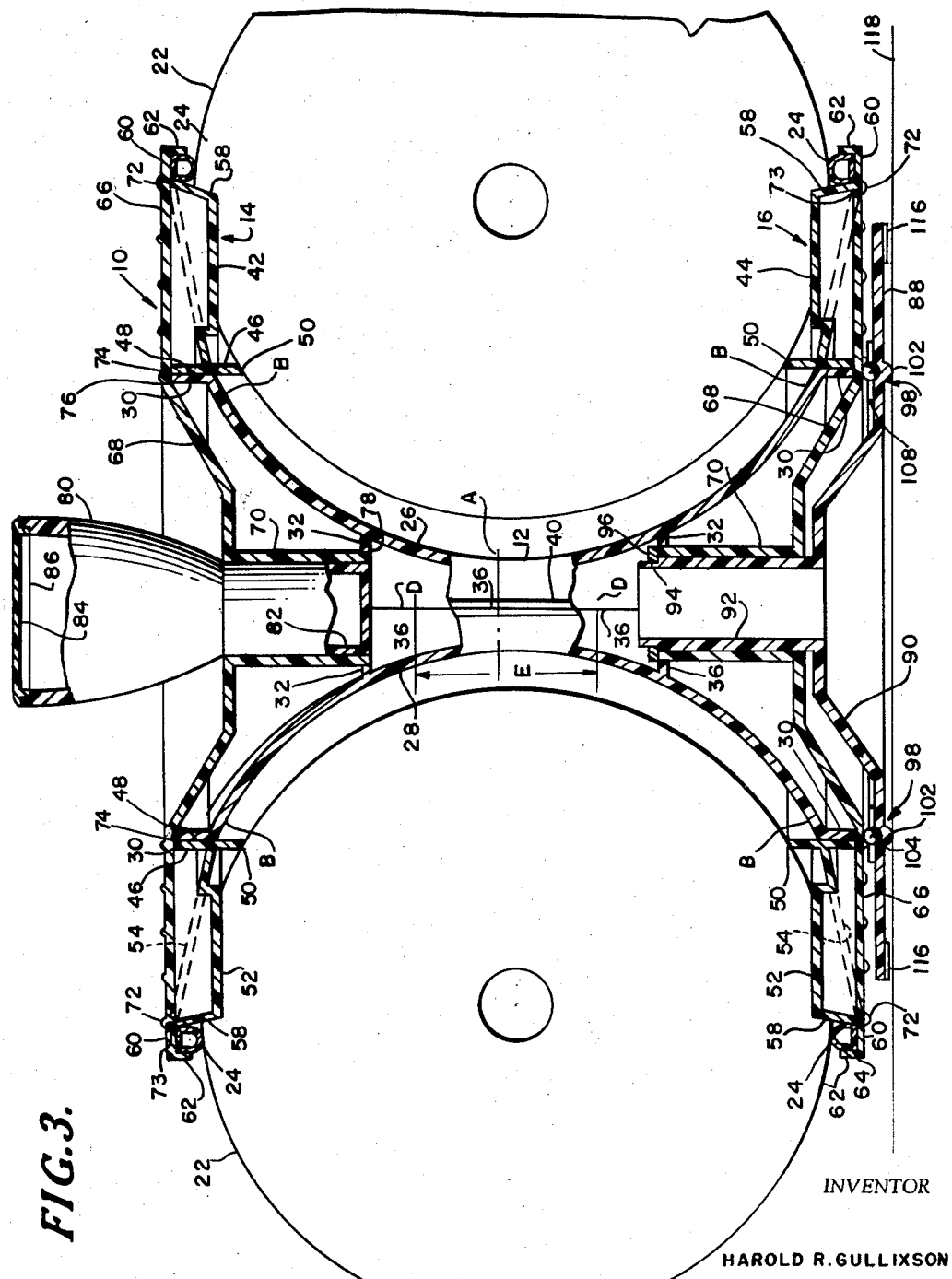
Figure 3 is a vertical sectional view of the article holder, parts being in elevation to better disclose certain features of the invention.

Referring now to Figures 3 and 8, it will be noted that the members or sections 26 and 28 are provided with a tongue and groove connection 34 along their abutting edges 36. In addition to the tongue and groove connection 34, each of the members 26 and 28 is provided with a raised or quarter round bead on its outer surface, as indicated at 38, adjacent each of its edges 36. The quarter round bead 38 on the surface of the members 26 and 28 form a half round bead 40 on the center post 12 when the members 26 and 28 are assembled as a unit. The bead 40 extends lengthwise of the center post 12 and serves to further strengthen the assembled center post against the previously mentioned cold flow characteristics of the polystyrene from which the center post is manufactured. In addition, the bead 40, when the center post is assembled in the frame structure, is aligned with a pair of aligned grooves 18 and 20 so that it provides a visual indicator or guide means whereby a user of the device may properly align one of the articles 22 into a pair of aligned grooves 18 and 20. When one article is properly positioned in a pair of aligned grooves 18 and 20 it is easy for subsequent articles to be inserted in the proper aligned grooves.

Since the center post 12 must be of a relatively small diameter at its center or middle portion A, it is evident that the center post would have a tendency to fracture at this point when loads are applied to the frame structure 10 of the article holder. To prevent fracture or failure of the center post in the area adjacent its middle A, the sections or members 26 and 28 when assembled together as a unit are glued or cemented inwardly from their ends to a position D terminating short of the center or middle portion A of the center post 12. This leaves the abutting edges 36 of the members 26 and 28 unglued along the length of the edges 36, as indicated at E in Figure 3. By having the seam formed by the abutting edges 36 of the center post 12 unglued along their length, as indicated at E, the center post is flexible in this area and is capable of withstanding higher loads and shocks thereby reducing the tendency of failure at this point.

Referring now to Figures 3, 8, 9 and 10, the disk-shaped plate elements 14 and 16 which are connected to the center post 12 are formed in the shape of annular rings 42 and 44, respectively, the rings being manufactured from a high impact polystyrene material by injection molding. Each of the rings 42 and 44 are identically formed and therefore the descritpion of the upper ring 42 will suffice for the description of the lower ring 44. The ring 42 is molded with an inner annular flange 46, the flange 46 having a diameter equal to the outside diameter of the circumferential flanges 30 on the ends of the center post. As shown in Figure 3 the ring 42 is adapted to slide onto the center post and be secured thereto by gluing, cementing or the like, between its annular flange 46 and the circumferential flange 30, as indicated at 48. The flange 46 extends downwardly below the flared surface of the center post and is beveled, as indicated at 50. The beveled portion 50 of flange 46 provides an inner stop for the article 22 when inserted in one of the grooves 18, as shown in the dotted lines of Figure 10.

The radially extending grooves 18 of the upper ring 42 are formed identically with the radially extending grooves 20 of the lower ring 44. The grooves 18 and 20 are molded into the rings 42 and 44, respectively, so that there is a raised portion 52 between each of the grooves. Of course the raised portion 52 between the grooves provides a reverse configuration on the outer surface 54 of each of the rings 42 and 44. The outer surface 54 of the rings 42 and 44 tapers, as shown in Figure 10, from approximately the center of the flange 46 to a point 56 where it flares onto the leading edge 58 of the raised portion 52. The leading edge 58 of the raised portion 52 is rounded or beveled, as shown in Figure 8, so that the entrance to the grooves 18 and 20 of the rings 42 and 44 is wider and permits easier insertion and alignment of an article into a pair of aligned article receiving grooves.

A flange 60 extends radially outwardly from the outer end of the leading edge 58. Flange 60 on its outer end is provided with a peripheral flange 62, which extends parallel to the axis of the rings 42 and 44. The peripheral flange 62 and the radially extending flange 60 defines a circumferential groove 64 which is adapted to receive the compressible resilient strips or ring 24. As is clearly shown in Figures 3 and 10 the resilient strips 24 fit into the circumferential grooves 64 and restrict entry to and from the article receiving grooves 18 and 20 of the annular disks or rings 42 and 44, respectively. The resilient strips 24 are ring shaped and are glued or cemented in the grooves 64. The peripheral flange 62 prevents the bonding of the resilient strips 24 from failing from the continued flexing of the strips in that it prevents the strips from tending to move radially outwardly as an article 22 is removed from a pair of aligned grooves 18 and 20. In addition, the flanges 62 provide a means for hiding the bonding of the strips 24 in the grooves 64 and also make it possible to eliminate the need for bonding of the strips or rings 24 in the grooves 64. However, in the preferred form of the invention, a better construction results when the strips 24 are bonded in the circumferential grooves 64. Peripheral flange 62, coupled with the annular flange 46 of each of the rings 42 and 44 help to prevent the rings from warping due to cold flow of the plastic material, when the rings are assembled on the center post 12.

The cross-section through any portion of the rings or disk members 42 and 44 is a substantially constant dimension and is in the order of .080 of an inch. By having the cross-section of the material a substantially constant dimension throughout, no internal stresses resulting from cold flow characteristics of polystyrene are evident and, further, the injection molding of the unit is simplified. The members 26 and 28 of the center post 12, like the rings 42 and 44, have substantially a constant sectional thickness dimension throughout in the order of .080 of an inch for the same reasons as the rings 42 and 44.

A pair of disk-shaped flange plates or members 66, which are dished at their center portion, as indicated at 68, are provided on each end of the frame structure 10 so as to positively strengthen the ring members 42 and 44 against warping resulting from the cold flow characteristics of polystyrene. The disk-shaped flange plates or members 66 are made by injection molding, the material being high impact polystyrene. The center portion of each of the flange members 66 is provided with a tubular sleeve 70 which is adapted to extend inwardly of the hollow center post 12 and be secured by gluing or cementing to the inner edge of the arcuate flange 32 of the center post. The outer periphery of the flange member 66 is provided with a circumferential bead 72 which is adapted to overlap a portion of the flange 60 of ring members 42 and 44. As is clearly shown in Figure 3, the flange member 66 is attached to the ring members 42 and 44 adjacent the outer and inner peripheries of the ring members, as indicated at 73 and 74 respectively. In addition, the flange members 66 are rigidly secured to the center post 12 along its outer edge, as indicated at 76, and to the flanges 32, as indicated at 78. Consequently, any tendency of the ring members 42 or 44 to sag from weight of articles carried, or to warp, in either direction from the cold flow characteristics of polystyrene, is eliminated.

A knob 80, with a stem 82, is attached in the tubular sleeve 70 of the upper plate member 66. The stem 82 is adhesively secured to the inner walls of the tubular sleeve 70. Knob 80, which may be hollow, is provided with a cap 84 made of a transparent material and capable of being removably secured thereto. A picture or other ornament 86 may be placed under the cap 84 and held in position thereby.

Referring to Figures 3, 4, 5, 6 and 7, a base plate 88, dished in its center portion, as indicated at 90, is provided for rotatably supporting the frame structure 10 on either a vertical or horizontal axis. The base plate 88 is provided with a tubular sleeve 92 which is adapted to extend upwardly through the tubular sleeve 70 of the lower flange plate 66, the upper end of the sleeve 92 being provided with a circumferential groove or undercut portion 94. A plastic ring 96 secured to the undercut or grooved end 94 of the sleeve 92 retains the base plate 88 in axial relationship with respect to the lower flange plate 66. Since the ring 96 is not glued to the tubular sleeve 70 of the lower flange plate 66, the base plate 88 may be rotated with respect to the frame structure 10.

Bearing means, generally indicated at 98, is provided between the base plate 88 and the flange plate 66 so that the frame structure 10 may be easily rotated on the base plate. In more detail, the base plate 88, which is molded from high impact polystyrene, is provided with a circular groove 100, a circular bead 102 being provided on the lower surface of the base plate immediately opposite the groove 100. The groove 100 provides a race for a plurality of ball bearings 104 which ride in the groove 102 and bear against the lower surface 106 of the lower flange plate 66. A ring-shaped ball bearing race or retainer element 108 having a plurality of circumferentially spaced bearing receiving holes or apertures 110 is provided between the base plate 88 and the lower flange plate 66 to retain and space ball bearings 104 in the groove 100. A collar 112 is integrally molded on the spacer ring about each of the apertures or holes 110. The surface of the spacer ring 108 which opposes the surface of the base plate 88 is provided with arcuate-shaped lugs 114 which are adapted to ride in the race or groove 100 on the base plate. The arcuate lugs 114 prevent the ring 108 from slipping transversely of the base plate when the base plate is assembled on the frame structure 10.

As shown in Figure 4, the base plate has a square configuration and is provided at its corners with downwardly extending lugs 116. The lugs 116, as shown in Figure 3 do not normally touch the surface of a table, represented by the phantom line 118, when weight is evenly distributed through the bearings 104 to the base plate 88. In other words, the lugs 116 do not project below the lower surface of the base plate 88 as great a distance as the circumferential bead 102 through which the weight is distributed to the top of table 118. Referring now to Figure 5, when a greater load L' is applied to one side of bead 102 than the load L" on the other side of the bead, the frame structure may have a tendency to tilt. The lug 116 on the side of the base plate 88 to which the load L' is applied will contact the table surface 118 and will help to support the frame structure from tipping over. The tendency of the frame structure 10 to tilt occurs only when articles 22 are stored on just one side of the frame structure and are not evenly distributed about the holder. On the other hand, if the loads L' and L" are substantially equal to each other, as would be the case when records are more or less distributed evenly around the article holder, the device would sit on the table structure 118, as shown in Figure 3 with all of the lugs 116 out of contact with the top of the table.

Referring now to Figures 3 and 10, it will be noted that the resilient compressible strip or ring member 24 is tubular and is provided with a cross-sectional shape wherein the walls of the tube are of substantially a constant thickness. The upper portion of the ring or strip 24 is rounded, as indicated at 120, so as to provide smooth insertion and removal of articles from aligned article receiving grooves 18 and 20. The resilient strip is preferably made from a non-migrating vinyl plastic material. However, other materials, such as rubber or rubber-like products or other resilient plastic materials, could be utilized.

In Figure 10, a fragmentary section of the record 22, shown in the full lines, is being inserted into the article receiving groove 20 of the lower disk 16. The resilient strip or ring 24 is shown compressed so as to permit the entry of the record past its diameter. When the record or article 22 is fully inserted into the groove, it assumes the dotted line position of Figure 10 and it will be noted that the resilient strip or ring 24 has returned to its normal relaxed position providing an outer stop for the groove. The record or disk-shaped article 22 will be supported at two points, namely, at the top 122 of the resilient strip 24 and on the beveled surface 50 of the inner stop or flange 46. The upper portion of the record which is positioned in the slot 18 of the upper ring 42 aligned with the slot 20 of the lower ring 44 is likewise supported at two points. The record does not rest on or touch the bottom of either of the article receiving grooves 18 and 20, the side walls of the grooves merely preventing the record from falling out of a substantially vertical plane. When the records are positioned within the grooves they are substantially rigidly held and the article holder may be moved about or may be mounted on a horizontal axis as the records will not fall therefrom. It takes at least a manual radial thrust either inwardly or outwardly to insert or remove a record from a pair of aligned article receiving grooves 18 and 20.

Figure 11 discloses a modified form of article retaining ring 24'. The retaining ring 24' has substantially the same external configuration as the retaining ring 24 but in section, the vertical walls are tapered as indicated at 126 so that the base wall 128 is relatively thick compared to the side walls 130. The sloping walls 132 are also tapered. However, the top portion of the ring in section is relatively thick, as indicated at 122'. By providing a sectional configuration, such as disclosed in Figure 11, for the article retaining ring 24', it will be easier to flex or compress the walls 132 upon insertion and removal of records from article receiving grooves 18 and 20. Stated another way, when the retaining ring 24' is compressed, the flexing takes place at the thin portion of its walls and is not transmitted through the vertical walls 130 to the base wall 128. In this form of the invention, the grooved rings or members 42 and 44 need not be provided with the peripheral flange 62 on radial flange 60 as the bonding of the rings 24' to the flange 60 and to the leading edge 58 of the raised portion 52 is sufficient to hold the ring against outward movement. Since the base wall 128 has no strain thereon from continued compression of the ring, there will be little chance of the bonding material fracturing at this point. However, it is preferred to have the peripheral flange 62 on the ring members 42 and 44 as this positively prevents any outward movement of the article retaining ring 24' upon withdrawal of articles from the article receiving grooves.

Referring now to Figure 9, a fragmentary portion of the top disk element or ring 42 is shown, with the flange plate 66 removed. It will be noted that in this view the radially extending flange 60 is provided with numerals 140 molded therein adjacent each of the grooves 18. The grooves 18, which are on the undersurface of the ring 42, do not appear in Figure 9 as the bottom wall of the grooves forms a part of the surface 54. The numerals or indicia 140 may be used with a suitable article locator device, such as disclosed in my aforementioned application, Serial No. 599,762, for identifying filing positions for articles in the article receiving grooves 18 and 20.

The terminology used in this specification is for the purpose of description and not limitation, the scope of the invention being defined in the claims.

I claim:

1. In a device of the class described for holding substantially flat articles, a frame structure, said frame structure including spaced parallel plate elements, said plate elements having a plurality of aligned article-receiving grooves in their opposed surfaces, said article-receiving grooves extending from adjacent the edges of said plate elements inwardly thereof, a strip made of a compressible resilient material and carried by at least one of said plate elements for restricting entrance to said aligned article-receiving grooves to thereby retain articles therein, said resilient strip being capable of compression in an area of one of said article-receiving grooves by insertion and removal of an article therefrom without disturbing restriction of adjacent article-receiving grooves, said resilient strip being completely expanded when an article is in said article-receiving grooves to thereby retain the article in the aligned article-receiving grooves without pressure on the article, means adjacent the edge of the plate element for receiving said resilient strip, said means for receiving said resilient strip including a flange provided on the edge of said plate element and spaced from the ends of the article-receiving grooves in the plate element and defining a groove on said plate element extending substantially transverse of the article-receiving grooves, said groove being of a width capable of receiving said resilient strip and said flange preventing said resilient strip from movement outwardly away from said article-receiving grooves when an article is removed therefrom.

2. A device of the character described in claim 1, wherein said resilient strip is hollow and is made of a vinyl plastic material.

3. In a device of the class described for holding substantially flat articles, a spool-shaped frame structure, said frame structure including a center post and parallel disks carried by said center post in spaced relationship to each other, said spaced disks having a plurality of aligned article receiving grooves in their opposed surfaces, said article receiving grooves extending from adjacent the peripheral edges of said disks inwardly toward said center post, a peripheral flange on each of said disks, said peripheral flange being spaced outwardly from the outer ends of said grooves so as to define a circumferential groove adjacent the periphery of said disks, a strip made of a compressible resilient material and carried in the circumferential groove of each of said disks, said resilient strip restricting entry of articles into and from aligned article receiving grooves, said resilient strip being capable of compression in an area of one of said article-receiving grooves by insertion and removal of an article therefrom without disturbing restriction of adjacent article receiving grooves, said resilient strip being completely expanded when an article is in said article-receiving grooves to thereby retain the article in the aligned article-receiving grooves without pressure on the article.

4. A device of the character described in claim 3, wherein said resilient strip is cemented in said circumferential groove.

5. A device of the character described in claim 3, including means carried by said disks inwardly of said aligned article receiving grooves to limit inward movement of articles therein, said means including a circumferential flange provided on said disks adjacent the inner ends of said grooves.

6. A device of the character described in claim 3, including means provided on said center post visible in the absence of an article from said aligned article-receiving grooves for aligning the article with aligned article receiving grooves.

7. In a device of the class described for holding substantially flat articles, a spool-shaped frame structure, said frame structure including a center post and parallel disks carried in spaced relationship on said center post, said spaced disks having a plurality of aligned article receiving grooves in their opposed surfaces, said article receiving grooves extending radially inwardly from adjacent the peripheral edges of said disks, and means carried by said center post visible in the absence of an article from said aligned article-receiving grooves for aligning the article with a pair of aligned article receiving grooves in said disks.

8. A device of the character described in claim 7, wherein said aligning means includes a visible bead extending along the surface of said center post centrally of a pair of aligned article receiving grooves.

9. A device of the character described in claim 7, including means carried by at least one of said disks adjacent its periphery and restricting the outer ends of the grooves thereon for retaining articles in the aligned article receiving grooves.

10. A device of the character described in claim 9, wherein said means for restricting the entrance into the ends of the grooves is a resilient strip carried on the periphery of one of said disks, said strip being capable of compression upon insertion and removal of articles from said article receiving grooves.

11. In a device of the class described for holding substantially flat disk-shaped articles, a spool-shaped frame structure, said frame structure including a hollow center post having an axial cross-section which is small at its middle and flares outwardly toward its ends, said center post comprising radially complementary members made of polystyrene and having a tongue and groove connection along their abutting edges, ring-shaped members secured to each end of said center post, said ring-shaped members extending radially of the axis of said center post and having aligned article receiving grooves in their opposed surfaces, said ring-shaped members being made of polystyrene, means carried about the periphery of said ring-shaped members for restricting the entrance to said article receiving grooves and for retaining articles in said article receiving grooves, and means carried inwardly of said article receiving grooves for limiting inward movement of articles in said article receiving grooves, said means restricting the entrance of said article receiving grooves and said means limiting inward movement of articles in said article receiving grooves cooperating with each other to support articles in said article receiving grooves at two points.

12. A device of the character described in claim 11, wherein said radially complementary members of said center post are secured together along their abutting edges by cement from their ends toward but terminating short of their center.

13. A device of the character described in claim 11, wherein a disk-shaped flange member is provided on each end of said center post, said disk-shaped flange members being secured to the ends of said center post and to the outer periphery of said ring-shaped members to thereby prevent warping of said ring-shaped members due to cold flow characteristics of polystyrene.

14. A device of the character described in claim 13, wherein at least one of said disk-shaped flange members is provided with a tubular member extending axially into said hollow center post and a base member for supporting said frame structure, said base member having a center post rotatably mounted within the tubular member of one of said disk-shaped flange members.

15. A device of the character described in claim 11, wherein said center post is provided with a bead extending along the abutting edges of said complementary members, said bead being aligned with a pair of aligned grooves of said ring-shaped members whereby articles may be aligned and easily inserted into the pair of aligned article receiving grooves.

16. In a device of the class described for holding substantially flat disk-shaped articles, a spool-shaped frame structure, said frame structure including a hollow center post having an axial cross-section which is small at its middle and flares outwardly toward its ends, said center post comprising radially complementary members made of a non-brittle plastic material, ring-shaped members made of a non-brittle plastic material secured to each end of said center post, said ring-shaped members extending radially of the axis of said center post and having aligned article receiving grooves in their opposed surfaces, said ring-shaped members having an annular flange spaced inwardly from said grooves and restricting the inner end of said grooves, said ring-shaped members having a peripheral flange spaced outwardly from the outer ends of said grooves and defining a circumferential groove, a resilient strip carried in said circumferential groove of each of said ring-shaped members, said resilient strip at least partially restricting the outer end of each of said grooves and capable of compression upon entry and removal of articles to and from said grooves, and a disk-shaped flange member made of a non-brittle plastic material secured on each end of said center post and to the inner and outer periphery of said ring-shaped members, said disk-shaped flange member preventing warping of said ring members due to cold flow characteristics of a non-brittle plastic material.

17. A device of the character described in claim 16, including a base member for supporting said frame structure, said base member being made of a non-brittle plastic material and rotatably supporting said frame structure.

18. A device of the character described in claim 17, wherein said base member is provided with an annular bead on one surface and an aligned annular groove on its other surface, bearing means between said base member and said frame structure, said bearing means including a plurality of ball bearings in said groove and an annular ball bearing race element for spacing and retaining said ball bearings in said annular groove.

19. A device of the character described in claim 18, wherein said base member is provided with downwardly extending lugs on its lower surface, said lugs being positioned outwardly of said annular bead and having a thickness less than the thickness of said bead.

20. A device of the character described in claim 16, wherein each of said radially complementary members, said ring-shaped members and said disk-shaped flange members is molded from a high impact polystyrene and has a substantially constant section thickness throughout.

References Cited in the file of this patent

UNITED STATES PATENTS

| | | |
|---|---|---|
| 1,030,534 | Pooler | June 25, 1912 |
| 1,213,026 | Sande | Jan. 16, 1917 |
| 1,436,026 | Ferge | Nov. 21, 1922 |
| 2,482,572 | Avigdor | Sept. 20, 1949 |
| 2,710,694 | Carr | June 14, 1955 |